(12) United States Patent
Qu et al.

(10) Patent No.: US 11,428,439 B2
(45) Date of Patent: Aug. 30, 2022

(54) MULTI-FUNCTIONAL MULTI-PURPOSE TILE AND PLATE

(71) Applicant: BEIJING WADENER TECHNOLOGY CO. LTD, Beijing (CN)

(72) Inventors: Yunliang Qu, Beijing (CN); Jian Cui, Beijing (CN); Zhixiang Ying, Beijing (CN); Fang Shen, Beijing (CN); Bin Qu, Beijing (CN); Xinrong Wang, Beijing (CN); Chen Zhang, Beijing (CN); Xiangdong Li, Beijing (CN); Hongxing Wang, Beijing (CN)

(73) Assignee: BEIJING WADENER TECHNOLOGY CO. LTD, Beijing (CN)

( * ) Notice: Subject to any disclaimer, the term of this patent is extended or adjusted under 35 U.S.C. 154(b) by 665 days.

(21) Appl. No.: 15/316,836

(22) PCT Filed: Jul. 24, 2014

(86) PCT No.: PCT/CN2014/000703
§ 371 (c)(1),
(2) Date: Dec. 6, 2016

(87) PCT Pub. No.: WO2015/188291
PCT Pub. Date: Dec. 17, 2015

(65) Prior Publication Data
US 2017/0108243 A1    Apr. 20, 2017

(30) Foreign Application Priority Data
Jun. 13, 2014    (CN) .......................... 201410260677.9

(51) Int. Cl.
*F24S 20/61*    (2018.01)
*F24S 20/69*    (2018.01)
(Continued)

(52) U.S. Cl.
CPC ............... *F24S 20/61* (2018.05); *F24S 20/69* (2018.05); *F28F 3/12* (2013.01); *F28F 13/18* (2013.01);
(Continued)

(58) Field of Classification Search
CPC .......... F24S 10/80; F24S 10/753; F24S 10/30; F24S 10/502; F24S 20/61; F24S 20/69;
(Continued)

(56) References Cited

U.S. PATENT DOCUMENTS 3,981,294 A * 9/1976 Deminet .................. F24S 80/52
126/633
4,076,013 A * 2/1978 Bette ...................... F24D 11/007
126/620
(Continued)

FOREIGN PATENT DOCUMENTS

CA    3016722 A1 * 10/2017 .............. F24S 80/30
CN    200993485 Y    12/2007
(Continued)

*Primary Examiner* — Jorge A Pereiro
*Assistant Examiner* — Nikhil P Mashruwala (57) ABSTRACT

A tile or plate, includes: an upper plate (3) and a lower plate (4); wherein a plurality of heat conducting cavities (6) are uniformly provided between the upper plate (3) and the lower plate (4) via connecting ribs (5). A solar collection layer is provided on an upper surface of the tile or the plate. Two ends of the tile or the plate are connected with each of the plurality of heat conducting cavities (6) via transverse connecting pipes (23, 37, 42). The transverse connecting pipes (23, 37, 42) of two neighboring tiles are connected by a ferrule (17) or a hose (36) to form an integrated circulation system. The tile or plate has a large day-lighting area and a high energy conversion rate.

4 Claims, 10 Drawing Sheets

(51) Int. Cl.
*F28F 3/12* (2006.01)
*F28F 13/18* (2006.01)
*F24S 20/00* (2018.01)

(52) U.S. Cl.
CPC ....... *F24S 2020/17* (2018.05); *F28F 2245/06* (2013.01); *Y02B 10/20* (2013.01); *Y02E 10/44* (2013.01)

(58) Field of Classification Search
CPC .. F28F 3/12; Y02E 10/44; Y02E 10/40; Y02E 10/20
USPC .................................................. 126/621–623
See application file for complete search history.

(56) References Cited

U.S. PATENT DOCUMENTS

| | | | | |
|---|---|---|---|---|
| 4,098,331 A * | 7/1978 | Ford | ............... | F24S 10/502 165/170 |
| 4,114,597 A * | 9/1978 | Erb | ............... | F24S 80/30 126/665 |
| 4,120,286 A * | 10/1978 | Farber | ............... | F24S 80/30 126/648 |
| 4,178,914 A * | 12/1979 | Erb | ............... | F24S 10/73 126/674 |
| 4,204,522 A * | 5/1980 | Wilson | ............... | F24S 10/753 126/660 |
| 4,221,210 A * | 9/1980 | Cvijanovich | ............... | F24S 10/73 126/591 |
| 4,222,373 A * | 9/1980 | Davis | ............... | F24S 70/16 126/664 |
| 4,257,398 A * | 3/1981 | Watson | ............... | F24S 80/525 126/612 |
| 4,281,642 A * | 8/1981 | Steinberg | ............... | F24S 23/70 126/661 |
| 4,300,539 A * | 11/1981 | Dobson | ............... | B28B 1/522 126/664 |
| 4,305,384 A * | 12/1981 | Proven | ............... | F24S 10/50 126/656 |
| 4,426,997 A * | 1/1984 | Bette | ............... | F24S 10/502 126/667 |
| 4,455,999 A * | 6/1984 | Heckenbleikner | .... | F24S 10/503 126/591 |
| 4,520,796 A * | 6/1985 | Slaminski | ............... | F24S 10/502 126/669 |
| 4,867,133 A * | 9/1989 | Sadler | ............... | F16L 13/103 126/663 |
| 5,217,000 A * | 6/1993 | Pierce-Bjorklund | ... | E04C 2/525 126/621 |
| 7,661,422 B2 * | 2/2010 | Liu | ............... | F24S 10/502 126/629 |
| 7,757,687 B2 * | 7/2010 | Liu | ............... | F24S 80/30 126/628 |
| 2004/0237960 A1 * | 12/2004 | Liu | ............... | F24S 50/00 126/628 |
| 2008/0236572 A1 * | 10/2008 | Schaefer | ............... | F24S 80/525 126/657 |
| 2009/0165483 A1 * | 7/2009 | Liu | ............... | F24D 5/005 62/235.1 |
| 2011/0088753 A1 * | 4/2011 | Ahlgren | ............... | H02S 20/00 136/246 |
| 2013/0333310 A1 * | 12/2013 | Damo | ............... | E04C 2/521 52/173.3 |
| 2014/0096762 A1 * | 4/2014 | Manderbacka | ......... | F24S 25/00 126/621 |

FOREIGN PATENT DOCUMENTS

| | | | | |
|---|---|---|---|---|
| CN | 101709597 | | 5/2010 | |
| CN | 203022246 U | | 6/2013 | |
| CN | 203595304 U | | 5/2014 | |
| CN | 103850405 A | | 11/2014 | |
| DE | 2719273 A1 * | | 11/1977 | ............ F28F 9/0243 |
| DE | 2632373 A1 * | | 1/1978 | ............ F24S 10/75 |
| DE | 2750602 A1 * | | 5/1978 | ............ F24S 80/30 |
| DE | 2711058 A1 * | | 9/1978 | ............ F24S 80/60 |
| DE | 2826832 A1 * | | 1/1979 | ............ F24S 20/67 |
| DE | 3310738 A1 * | | 9/1984 | ............ F24S 10/502 |
| DE | 3913552 A1 * | | 10/1990 | ............ A01G 9/22 |
| DE | 19607033 A1 * | | 8/1997 | ............ F24S 80/50 |
| FR | 2308064 A1 * | | 11/1976 | ............ F28F 9/162 |
| FR | 2360049 A1 * | | 2/1978 | ............ F24S 80/30 |
| JP | S5784951 | | 5/1982 | |
| JP | 60036842 A * | | 2/1985 | ............ F24S 10/73 |
| WO | WO-9638695 A1 * | | 12/1996 | ............ F24S 10/502 |
| WO | WO-2014164269 A1 * | | 10/2014 | ............ B23P 15/26 |
| WO | WO-2015044882 A1 * | | 4/2015 | ............ F24S 10/72 |

* cited by examiner

MULTI-FUNCTIONAL MULTI-PURPOSE TILE AND PLATE

CROSS REFERENCE OF RELATED APPLICATION

This is a U.S. National Stage under 35 U.S.C 371 of the International Application PCT/CN2014/000703, filed Jul. 27, 2014, which claims priority under 35 U.S.C. 119(a-d) to CN 201410260677.9, filed Jun. 13, 2014.

BACKGROUND OF THE PRESENT INVENTION

Field of Invention

The present invention relates to a multi-functional multi-purpose tile and plate, which belongs to the field of building materials.

Description of Related Arts

At present, all the solar water heaters and solar photovoltaic cells need separate installation and are not capable of being integrated with the buildings. However, the solar water heater is one of the most successful products that utilize solar power. The development of the solar water heaters has passed through three stages as follows. The first stage of the development of the solar water heaters is spraying black paint on an external surface of the water storage tank for serving as a solar thermal conversion coating; the second stage thereof is coating a plate with a solar energy absorbing layer for serving as a solar thermal conversion layer and then connecting a copper pipe with the water storage tank; and the third stage thereof is installing a solar energy vacuum glass pipe on an external of the water storage tank for serving a photo-thermal conversion device, in such a manner that the solar water heaters are fully utilized. A Chinese patent application with an application number CN01127092.6 and a publication number CN1405513A discloses a solar water heater which makes a great improvement on the basis of the solar energy vacuum glass pipe, but still has shortcomings of single function, small solar collection area, high cost, installation difficulty, incapability of being integrated with buildings and utilization limitation.

SUMMARY OF THE PRESENT INVENTION

An object of the present invention is to provide a multi-functional multi-purpose tile and plate which has a high solar energy collection area, a high photovoltaic conversion rate and convenient and simple installation. The multi-functional multi-purpose tile and plate of the present invention is capable of replacing various tiles and other plates on the wall, and has light weight, long service life and capability of being integrated completely with the buildings.

Accordingly, in order to accomplish the above objects, the present invention provides a multi-functional multi-purpose tile or plate, comprising: a plurality of heat conduction chambers 6 which are in a shape of a semicircle, a circle, a squircle, a rounded rectangle or a rhombus is evenly provided between an upper plate 3 and a lower plate 4 by a plurality of connecting ribs 5, so as to form a perforated plate; a left cover plate 1 and a right cover plate 7, concaves and convexes, or a hook shaped embedded device are respectively provided upwardly on a left end edge or a right end edge of the multi-functional multi-purpose plate; two ends of the multi-functional multi-purpose plate are communicated with each of the heat conduction chamber via a first group of horizontal tube connectors 23 and a second group of horizontal tube connectors 37; a third group of horizontal tube connectors 42 are connected by a card sleeve 17, a flexible tube 36, or a left plug bush 39 is connected with a right plug bush 41, so as to form an integrated circulatory system.

Further description of the present invention is illustrated as follows.

Preferably, the multi-functional multi-purpose tile or plate is in a shape of a long strip. A plurality of heat conduction chambers 6 are separated by a plurality of connecting ribs 5 and evenly provided between an upper plate 3 and a lower plate 4, so as to form a long strip plate with multi-holes; a left cover plate 1 and a right cover plate 8 are respectively provided on two side edges of the tile and both have an included angle of β, a top portion of the left cover plate A is horizontally bended by a certain length, and a top portion of the right cover plate 7 is horizontally bended by a certain length and then a horizontal bend of the right cover plate is bended downwardly with a included angle of β, wherein β varies within a range of 10-80 degrees, three angles in one tile are equal; a light and heat absorption layer 2, a photovoltaic layer or a thermal transmitting layer is provided on the upper plate 3, the left cover plate 1 and the right cover plate 7 of the tile.

Preferably, the multi-functional multi-purpose wall plate is in a shape of a long strip, a plurality of heat conduction chambers 6 are separated by a plurality of connecting ribs 5 and evenly provided between an upper plate 3 and a lower plate 4, so as to form a long strip wall plate with multi-holes; three layers of up, middle or low concave or convex are provided on two side walls of the wall plate; an up left concave 8 is provided on an up layer of a left edge; a left middle convex 9 is provided on a middle layer of the left edge and a left low concave 10 is provided on a low layer of the left edge; a right up convex 11 is provided on an up layer of a right edge of the wall plate, a right middle concave 12 is provided on a middle layer of the right edge and a right low convex 13 is provided on a low layer of the right edge; the concave or convex on the up layer, the middle layer and the low layer are in opposite direction; length of the concave and the convex on the left side or the right side in an identical layer are equal; a light and heat absorption layer 2 is provided on an up plane of the upper plate 3 of the wall plane, and the effect and a shape of the heat conduction chamber 6 of the light and heat absorption layer 2 is identical to the tile.

Preferably, the upper plate 3 is in a semicircular shape, a light and heat absorption layer 2 is provided on a top external surface of the upper plate 3, the lower plate 4 is a straight plate, a plurality of connecting ribs 5 are provided between the upper plate 3 and the lower plate 4, wherein the upper plate 3, the lower plate 4 and the connecting ribs 5 form the heat conduction chamber 6; a left join 14 is provided on a left end of the tile plate or the wall plate, and a hook which has an upward convex is provided on a left external end of the tile plate or the wall plate; a right join 15 is provided on a right end of the tile plate or the wall plate, and a hook which has a downward convex is provided on a right external end of the tile plate or the wall plate; two adjacent tile plate or wall plate are connected by insert an up left convex and a down left convex; a fixing lug 16 is provide on a right end surface of the tile plate or the wall plate, wherein the fixing lug 16 is fixed on a rooftop or a wall surface by a screw fastener, or the upper plate 4 is in a shape of triangles.

Preferably, the heat conduction chamber 6 is formed by the upper plate 3, the lower plate 4 and connecting ribs 5; wherein the upper plate 3 and the lower plate 4 are in a circular arc shape, the connecting ribs are in a linear shape; or the upper plate 3, the lower plate 4 and the connecting ribs are in a linear shape, and four corners of the upper plate 3 and the lower plate 4 are in a circular arc shape; the upper plate and the connecting ribs 5 are in a circular shape and the lower plate 4 is in a linear shape; or the upper plate 3, the lower plate 4 and the connecting ribs 5 are all in a circular shape; or the upper plate 3, the lower plate 4 and the connecting ribs 5 are all in a linear shape; or the upper plate 3 is in a semicircle shape and the lower plate 4 and the connecting ribs 5 are in a linear shape; or the upper plate 3 is in a triangle shape, the lower plate 4 and the connecting ribs 5 are in a linear shape.

Preferably, the first group of horizontal tube connectors 23 are oval pipes, a first connecting pipe 28 is externally provided on a right side of the first group of horizontal tube connectors 23, a shape of a periphery of the first connecting pipe 28 is identical to an internal hole of the heat conduction chamber (6), so as to match and connected the first connecting pipe 28 with the internal hole of the heat conduction chamber 6; the first connecting pipe 28 has a first connecting pipe hole 27 connected therein for communicating a tube cavity 24; external pallets 29 are respectively provided on an upper side or a lower side of each of the first connecting pipes 28; a space for connecting each of the connecting ribs 5 is provided between two adjacent connecting first pipes 28, so as to form a structure that is capable of inserting the upper plate 3, the lower plate 4 and the connecting ribs 5 of the tile or plate into a concave on a right side of a first group of horizontal tube connectors 23; and the tile or the plate is connected to the first group of horizontal tube connectors 23 to form an integral structure by adhering or welding; a U-shaped left tube 33 which has a larger diameter than the first group of horizontal tube connectors 23 is sleeved around three peripheral directions on a left side of the first group of horizontal tube connectors 23, a U-shaped right tube 22 which has a larger diameter than the first group of horizontal tube connectors 23 is sleeved around three peripheral directions on a right side of the first group of horizontal tube connectors 23, a plurality of oval concaves 18 with sealing rings 19 provided thereon are provided on a periphery of the first group of horizontal tube connectors 23; wherein the sealing rings 19 have two types of structures comprising an oval ring and an oval ring with a film shield.

Preferably, the multi-functional multi-purpose tile or plate, further comprises a draw-in attachment 17 which is U-shaped, and a U-shaped left sockolet 32 is provided in a left side of the draw-in attachment 17, and a U-shaped right sockolet 34 is provided on a right side of the draw-in attachment 17, the U-shaped left sockolet 32 and the U-shaped right sockolet 34 are inserted onto the U-shaped left tube 33 and the U-shaped right tube 22 on two ends of two adjacent horizontal tube connectors 23, in such a manner that adjacent horizontal tube connectors 23 are tightly connected, and the adjacent horizontal tube connectors 23 are sealed by a sealing ring 19 with a film shield on an end surface; a first baffle plate 25 for blocking the left cover plate 1 and the right cover plate 7 of two adjacent tiles or plates are provided upwardly on a right end surface of the draw-in attachment 17; a screw nail passes through the two adjacent tiles or plates, the left cover plate 1 and the right cover plate 7 to fixedly fasten the two adjacent tiles or plates to a roof; an end cap 31 is provided on a left side surface of the first group of horizontal tube connectors 23 on a left side, an inlet 20 is provided on an up surface of the first group of horizontal tube connectors 23 on the left side, and an outlet 21 is provided on the first group of horizontal tube connectors 23 on a right side; wherein the inlet 20 and the outlet 21 is communicated with an insulation barrel outside; the insulation barrel, the first group of horizontal tube connectors 23, the tube cavity 24, the first connecting pipe hole 27 and the heat conduction chamber 6 are filled with thermal medium 26, so as to absorb heat of sunlight by light and heat absorption layer 2 to form a heat circulation engineering; if the heat absorption layer 2 of the upper plate 3 of the tile or the plate adopts a photovoltaic layer, a double system engineering of heat and power supplying is achieved.

Preferably, the multi-functional multi-purpose tile or plate further comprises a second group of horizontal tube connectors 37, wherein two adjacent second group of horizontal tube connectors 37 are connected by a flexible pipe 36, a left end portion and a right end portion of the second group of horizontal tube connectors 37 are oval in shape and with inverted teeth, and the left end and the right end of the has smaller tube diameter than other portion of the second horizontal tube connectors 37; the flexible pipe 36 is in shape of a oval ring, end portions of the flexible pipe 36 is thickened in surfaces of two ends, so as to form a U shape outward, a card shell 35 is provided on a periphery on three directions of the flexible pipe 36, and a second baffle plate 38 is provided upwardly on a right end of the card shell 35.

Preferably, the multi-functional multi-purpose tile or plate further comprises a third group of horizontal tube connectors 42, wherein an external periphery of the third group of horizontal tube connectors 42 is a rectangular tube, and an inner cavity 24, a left plug bush 39 and a right plug bush 41 are all oval tube, a right side of the third group of horizontal tube connectors 42 extends and a bottom bench of the third group of horizontal tube connectors 42 is connected with a second connecting pipe 44 a shape of a periphery of the right side of the third group of horizontal tube connectors 42 is identical to an inner hole of the heat conduction chamber 6 for connecting a wall plate; a second connecting pipe hole 43 communicated with the tube cavity 24 is provided in the third group of horizontal tube connectors 42, a space for installing the connecting ribs 5 is provided between two adjacent second connecting pipes 44, so as to form a structure capable of inserting the second connecting pipe 44 into the heat conduction chamber 6 in the wall plate, and the two adjacent connecting pipes 44 form an integral structure by adhering or welding.

Preferably, a left plug bush 39 having a thickness of a half of a thickness of a tube wall of the third group of horizontal tube connectors 42 is provided on a periphery of an internal hole on a left end of the third group of horizontal tube connectors 42, and a right plug bush 39 having a thickness of a half of a thickness of a tube wall of the third group of horizontal tube connectors 42 is provided on a periphery on a right end of the third group of horizontal tube connectors 42, a concave of the "o" shaped ring 40 is provided on a periphery of the third group of horizontal tube connectors 42 is connected by inserting the left plug bush 39 and the right plug bush 41 and are sealed with each other by the "o" shaped ring 40; the light and heat absorption layer 2 is provided on an up surface of the third group of horizontal tube connectors 42 and the upper plate 3 of the wall plate; two adjacent wall plates are connected with each other by convexes and a concaves on a left end surface and a right end surface thereof, and a bolt 45 passes through the right low convex 13 to fix the wall plate; a first end of the third group of horizontal tube connectors 42 on a lower portion of the wall plate is connected with a bottom of the insulation barrels by pipes, and a second end thereof is sealed; a first end of the third group of horizontal tube connectors 42 on an upper portion of the wall plate is connected with an up portion of the insulation barrels by pipes, and a second end thereof is sealed; the insulation barrel, the tube cavity 24 of the third group of horizontal tube connectors 42, and the heat conduction chamber 6 are filled with thermal medium 26, so as to absorb heat of sunlight by light and heat absorption layer 2 to form a heat circulation engineering; if the heat absorption layer 2 adopts a photovoltaic layer, a double system engineering of heat and power supplying is achieved.

Preferably, an insulating layer 46 is provided on a bottom of the tile plate and the wall plate, and the insulating layer 46 is connected with the tile plate or the wall plate via an external backplate 47 to form an integral structure, in such a manner that a thermal insulation tile plate and a thermal insulation wall plate are formed for an energy-saving emission reduction engineering.

Compared with the conventional art, the multi-functional multi-purpose tile or plate of the present invention has advantages of simple and novel structure, light weight, low cost, large light collecting area, full function and multi-purpose. In addition, the multi-functional multi-purpose tile or plate of the present invention is capable of completely integrated with buildings and the insulation and energy saving effect and emission reduction function is excellent.

Reference numbers in the Figs are as follows.

1—left cover; 2—light and heat absorption layer; 3—upper plate; 4—lower plate; 5—connecting rib; 6—heat conduction chamber; 7—right cover; 8—up left concave; 9—left middle convex; 10—left low concave; 11—right up convex; 12—right middle concave; 13—right low convex; 14—left join; 15—right join; 16—fixing lug; 17—card sleeve; 18—concave; 19—sealing ring; 20—inlet; 21—outlet; 22—U-shaped right platform; 23—first group of horizontal tube connectors; 24—tube cavity; 25—first baffle plate; 26—thermal medium; 27—first connecting pipe hole; 28—first connecting pipe; 29—external pallet; 30—screw nail; 31—end cap; 32—U-shaped left sockolet; 33—U-shaped left platform; 34—U-shaped right sockolet; 35—card shell; 36—flexible pipe; 37—second group of horizontal tube connectors; 38—second baffle plate; 39—left plug bush; 40—"o" shaped ring; 41—right plug bush; 42—third group of horizontal tube connectors; 43—second connecting pipe hole; 44—second connecting pipe; 45—bolt; 46—insulating layer; 47—external backplate.

DETAILED DESCRIPTION OF THE PREFERRED EMBODIMENT

Referring to FIGS. 1-4 of the drawings, according to a preferred embodiment of the present invention, a multi-functional multi-purpose tile is in a shape of a long strip. A plurality of heat conduction chambers 6 are separated by a plurality of connecting ribs 5 and evenly provided between an upper plate 3 and a lower plate 4, so as to form a long strip plate with multi-holes. A left cover plate 1 and a right cover plate 8 are respectively provided on two side edges of the tile and both have an included angle of β. A top portion of the left cover plate A is horizontally bended by a certain length, and a top portion of the right cover plate 7 is horizontally bended by a certain length and then a horizontal bend of the right cover plate is bended downwardly with a included angle of β. β varies within a range of 10-80 degrees. The three angles in one tile are equal. A light and heat absorption layer 2, a photovoltaic layer or a thermal transmitting layer is provided on the upper plate 3, the left cover plate 1 and the right cover plate 7 of the tile.

Referring to FIGS. 5-8 of the drawings, according to a preferred embodiment of the present invention, a multi-functional multi-purpose wall plate is in a shape of a long strip. A plurality of heat conduction chambers 6 are separated by a plurality of connecting ribs 5 and evenly provided between an upper plate 3 and a lower plate 4, so as to form a long strip wall plate with multi-holes. Three layers of up, middle or low concave or convex are provided on two side walls of the wall plate. An up left concave 8 is provided on an up layer of a left edge; a left middle convex 9 is provided on a middle layer of the left edge and a left low concave 10 is provided on a low layer of the left edge. A right up convex 11 is provided on an up layer of a right edge of the wall plate, a right middle concave 12 is provided on a middle layer of the right edge and a right low convex 13 is provided on a low layer of the right edge. The concave or convex on the up layer, the middle layer and the low layer are in opposite direction. Length of the concave and the convex on the left side or the right side in an identical layer are equal. A light and heat absorption layer 2 is provided on an up plane of the upper plate 3 of the wall plane, and the effect and a shape of the heat conduction chamber 6 of the light and heat absorption layer 2 is identical to the tile.

Figure 1:
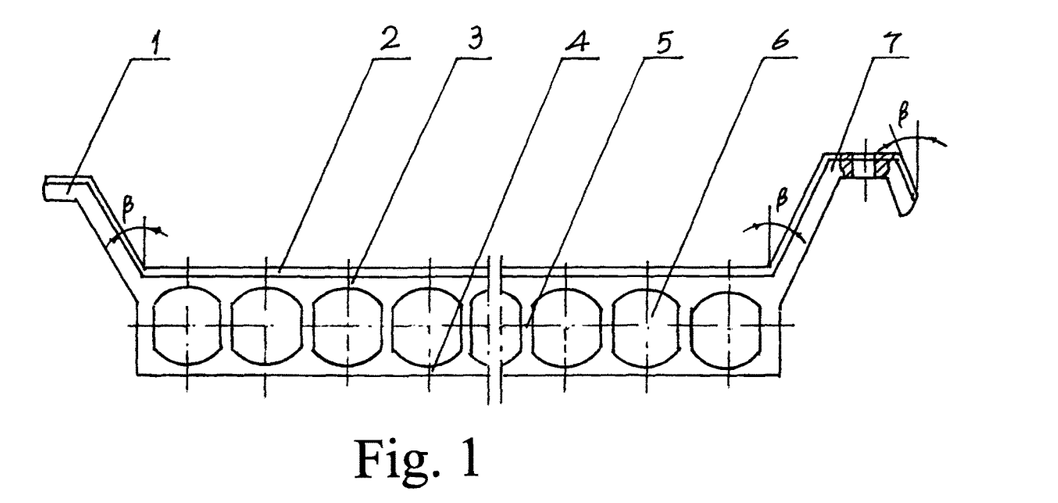
FIG. 1 is a structural schematic view of a cross section of a tile plate with a squircle shaped heat conduction chamber provided on a roof.
Figure 2:
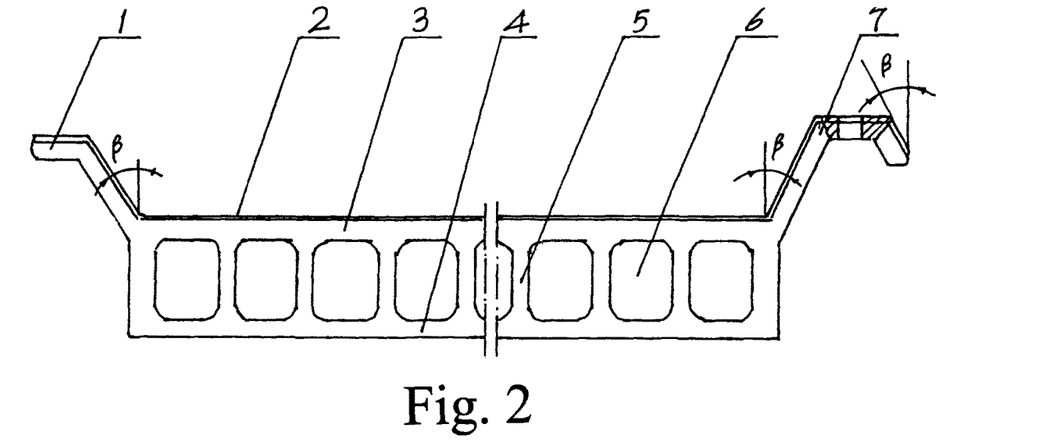
FIG. 2 is a structural schematic view of a cross section of a rounded rectangle shaped heat conduction chamber provided on a roof.
Figure 3:
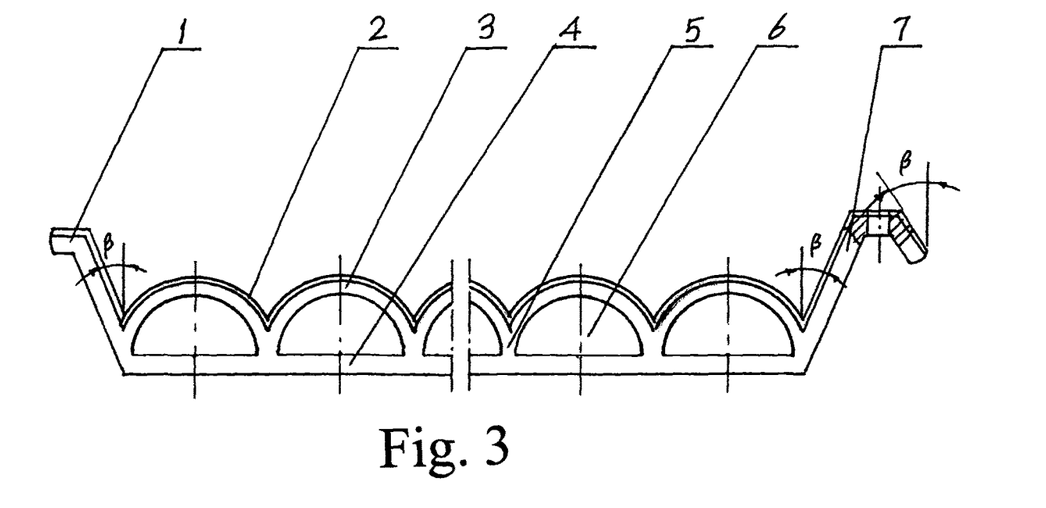
FIG. 3 is a structural schematic view of a cross section of a tile plate with a semicircle shaped heat conduction chamber provided on a roof.
Figure 4:
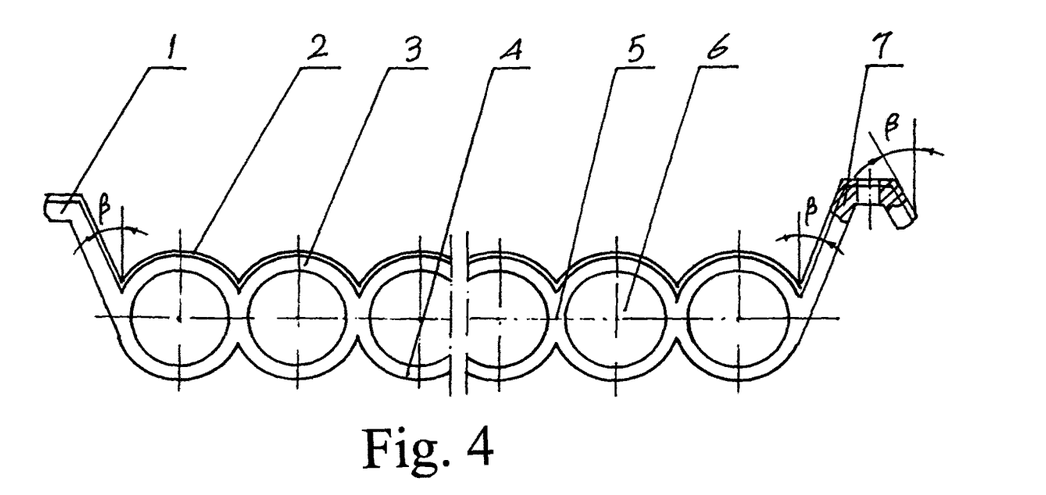
FIG. 4 is a structural schematic view of a cross section of a tile plate with a circular shaped heat conduction chamber provided on a roof.
Figure 5:
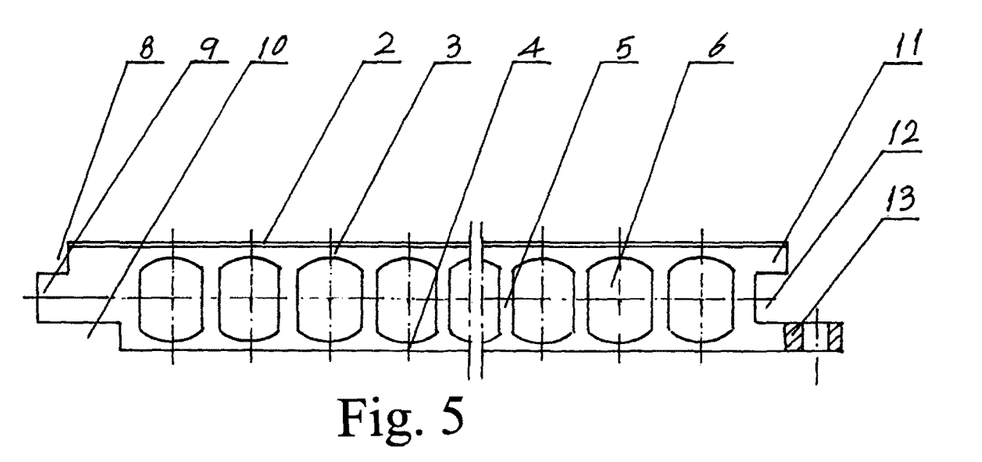
FIG. 5 is a structural schematic view of a cross section of a wall plate with a squircle shaped heat conduction chamber provided on a wall.
Figure 6:
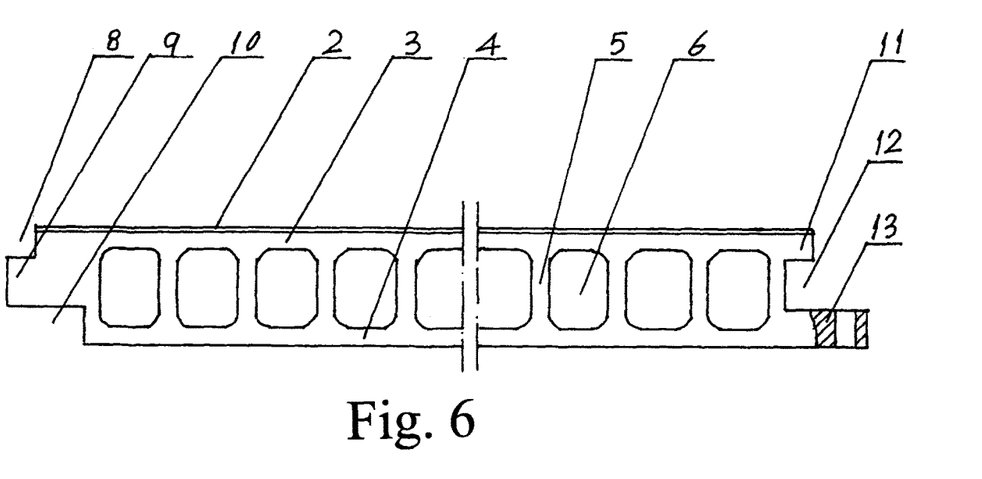
FIG. 6 is a structural schematic view of a cross section of a wall plate with a rounded rectangle shaped heat conduction chamber provided on the wall.
Figure 7:
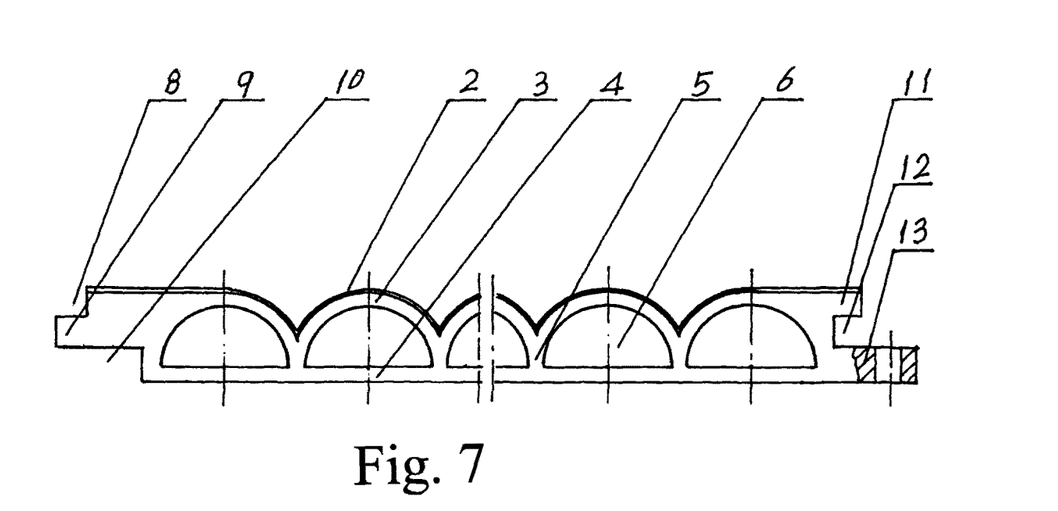
FIG. 7 is a structural schematic view of a cross section of a wall plate with a semicircle shaped heat conduction chamber provided on the wall.
Figure 8:
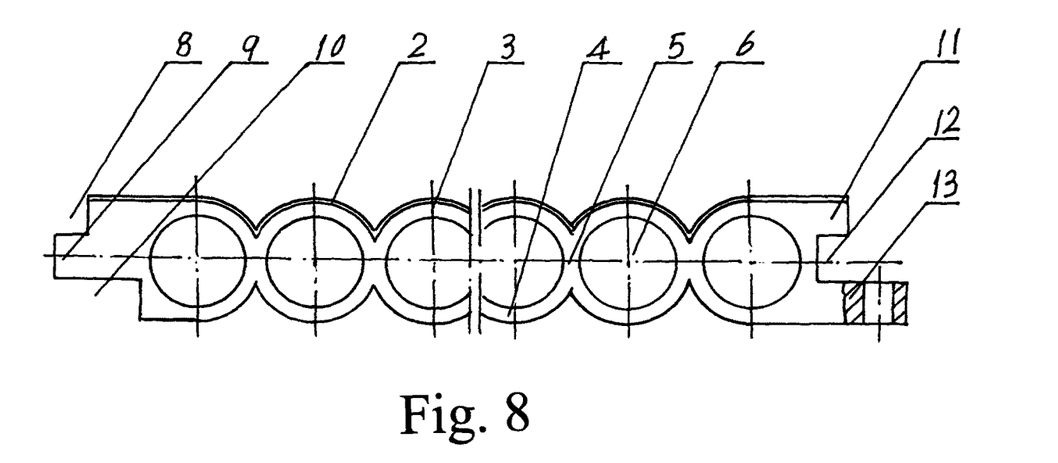
FIG. 8 is a structural schematic view of a cross section of a wall plate with a circular shaped heat conduction chamber provided on the wall.
Figure 9:
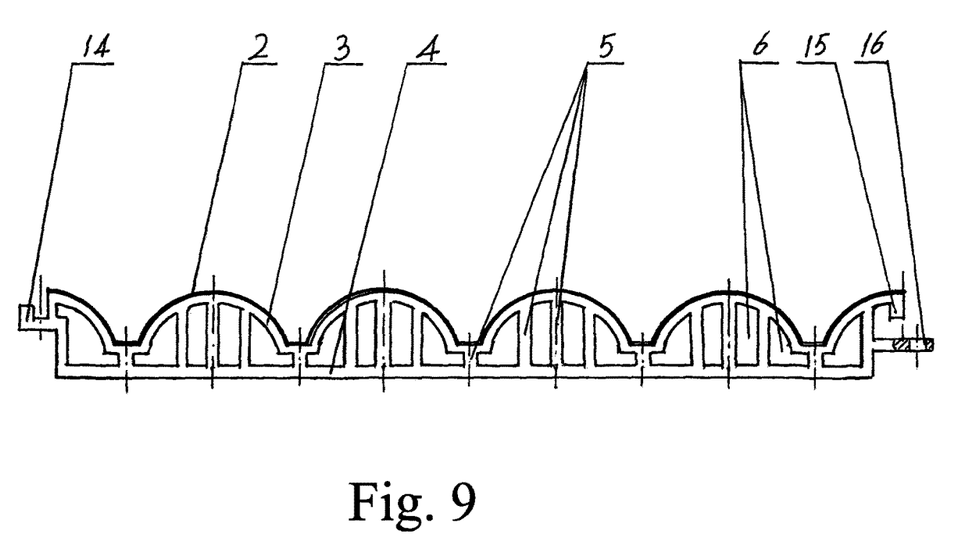
FIG. 9 is a structural schematic view of a cross section of a semicircle shaped heat conduction chamber provided on the wall or the roof.

Referring to FIG. 9, according to a preferred embodiment of the present invention, a multi-functional multipurpose tile plat is in a shape of a long strip. The upper plate 3 is in a semicircular shape, a light and heat absorption layer 2 is provided on a top external surface of the upper plate 3, the lower plate 4 is a straight plate, a plurality of connecting ribs 5 are provided between the upper plate 3 and the lower plate 4, wherein the upper plate 3, the lower plate 4 and the connecting ribs 5 form the heat conduction chamber 6; a left join 14 is provided on a left end of the tile plate or the wall plate, and a hook which has an upward convex is provided on a left external end of the tile plate or the wall plate; a right join 15 is provided on a right end of the tile plate or the wall plate, and a hook which has a downward convex is provided on a right external end of the tile plate or the wall plate; two adjacent tile plate or wall plate are connected by insert an up left convex and a down left convex; a fixing lug 16 is provide on a right end surface of the tile plate or the wall plate, wherein the fixing lug 16 is fixed on a rooftop or a wall surface by a screw fastener.

Figure 10:
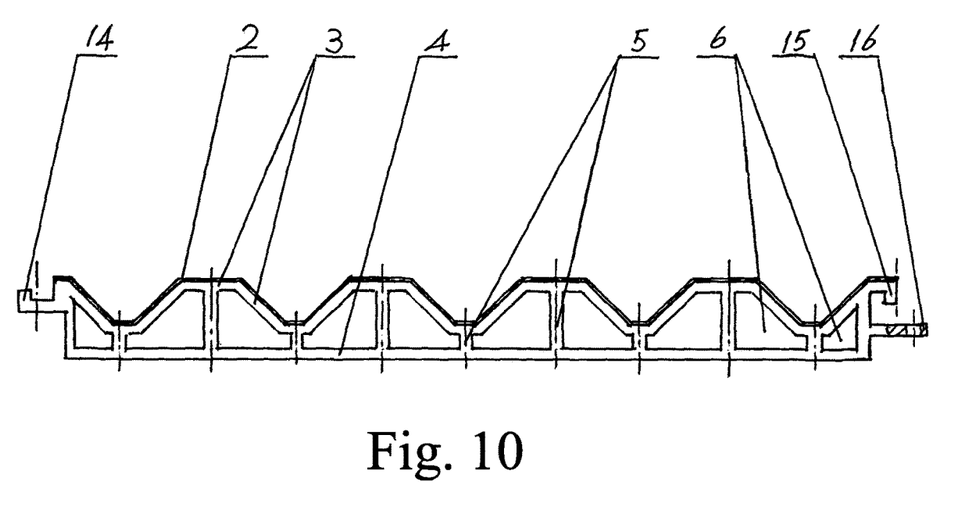
FIG. 10 is a structural schematic view of a cross section of a triangle shaped heat conduction chamber provided on the wall or the roof.

Referring to FIG. 10 of the drawings, a multi-functional multipurpose wall plate is in a shape of a long strip. The upper plate 3 can be in a shape of triangles. A light and heat absorption layer 2 is provided on an external side of the wall plate and the lower plate 4 is straight. Other structures and installation are identical to FIG. 9. The light and heat absorption layer 2 in FIG. 9 and FIG. 10 can be a photovoltaic layer or a thermal transmission layer.

The heat conduction chamber 6 is formed by the upper plate 3, the lower plate 4 and connecting ribs 5;

wherein the upper plate 3 and the lower plate 4 are in a circular arc shape, the connecting ribs are in a linear shape; or the upper plate 3, the lower plate 4 and the connecting ribs are in a linear shape, and four corners of the upper plate 3 and the lower plate 4 are in a circular arc shape; the upper plate and the connecting ribs 5 are in a circular shape and the lower plate 4 is in a linear shape; or the upper plate 3, the lower plate 4 and the connecting ribs 5 are all in a circular shape; or the upper plate 3, the lower plate 4 and the connecting ribs 5 are all in a linear shape; or the upper plate 3 is in a semicircle shape and the lower plate 4 and the connecting ribs 5 are in a linear shape; or the upper plate 3 is in a triangle shape, the lower plate 4 and the connecting ribs 5 are in a linear shape.

Figure 11:
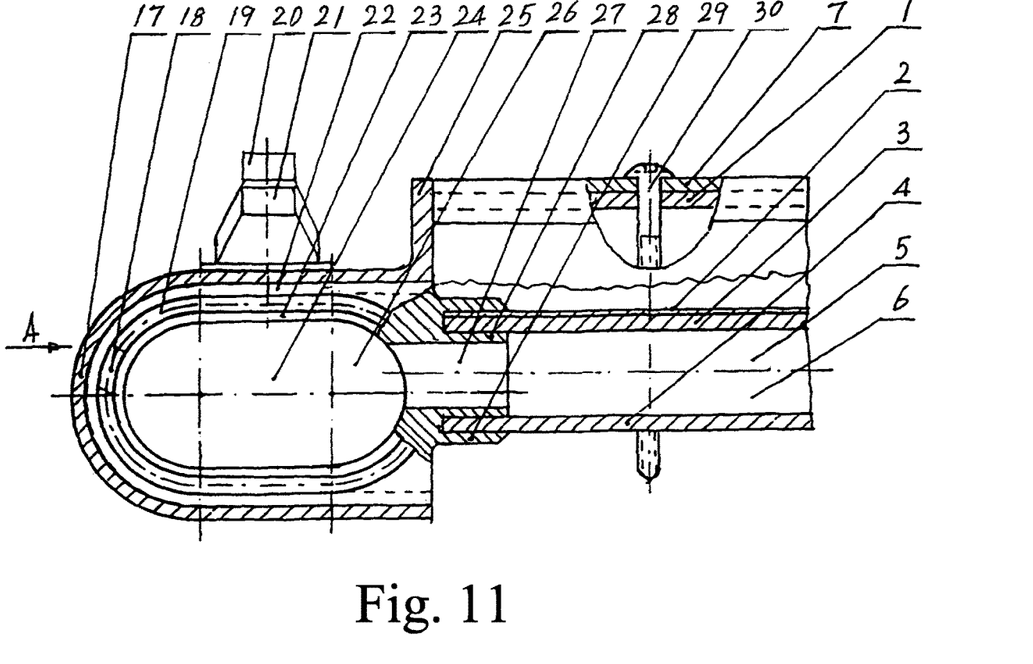
FIG. 11 is a schematic installation view showing connection between a tile and a horizontal tube connector, provide on the roof are connected by a card sleeve.
Figure 12:
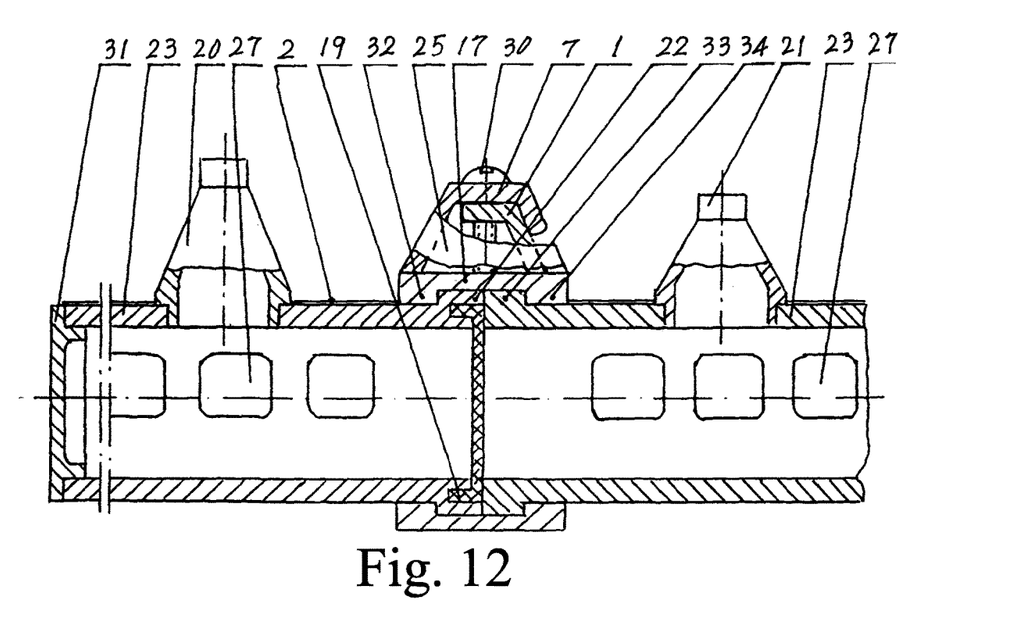
FIG. 12 is a side view of FIG. 9.

FIG. 11 and FIG. 12 are a schematic installation views showing connections between two adjacent tile plates, between the tile and the horizontal tube connector; and between two adjacent horizontal tube connectors; and showing cycling operation of the integral engineering of the tile plate connected by card sleeve which is filled with thermal medium 26. The first group of horizontal tube connectors 23 are oval pipes, a first connecting pipe 28 iexternally provided on a right side of the first group of horizontal tube connectors 23, a shape of a periphery of the first connecting pipe 28 is identical to an internal hole of the heat conduction chamber (6), so as to match and connected the first connecting pipe 28 with the internal hole of the heat conduction chamber 6; the first connecting pipe 28 has a first connecting pipe hole 27 connected therein for communicating a tube cavity 24; external pallets 29 are respectively provided on an upper side or a lower side of each of the first connecting pipes 28; a space for connecting each of the connecting ribs 5 is provided between two adjacent first connecting pipes 28, so as to form a structure that is capable of inserting the upper plate 3, the lower plate 4 and the connecting ribs 5 of the tile or plate into a concave on a right side of a first group of horizontal tube connectors 23; and the tile or the plate is connected to the first group of horizontal tube connectors 23 to form an integral structure by adhering or welding; a U-shaped left tube 33 which has a larger diameter than the first group of horizontal tube connectors 23 is sleeved around three peripheral directions on a left side of the first group of horizontal tube connectors 23, a U-shaped right tube 22 which has a larger diameter than the first group of horizontal tube connectors 23 is sleeved around three peripheral directions on a right side of the first group of horizontal tube connectors 23, a plurality of oval concaves 18 with sealing rings 19 provided thereon are provided on a periphery of the first group of horizontal tube connectors 23; wherein the sealing rings 19 have two types of structures comprising an oval ring and an oval ring with a film shield. See FIG. 12.

The multi-functional multi-purpose tile or plate further comprises a draw-in attachment 17 which is U-shaped, and a U-shaped left sockolet 32 is provided in a left side of the draw-in attachment 17, and a U-shaped right sockolet 34 is provided on a right side of the draw-in attachment 17, the U-shaped left sockolet 32 and the U-shaped right sockolet 34 are inserted onto the U-shaped left tube 33 and the U-shaped right tube 22 on two ends of two adjacent first group of the horizontal tube connectors 23, in such a manner that adjacent first group of horizontal tube connectors 23 are tightly connected, and the adjacent first group of horizontal tube connectors 23 are sealed by a sealing ring 19 with a film shield on an end surface; a first baffle plate 25 for blocking the left cover plate 1 and the right cover plate 7 of two adjacent tiles or plates are provided upwardly on a right end surface of the draw-in attachment 17; a screw nail passes through the two adjacent tiles or plates, the left cover plate 1 and the right cover plate 7 to fixedly fasten the two adjacent tiles or plates to a roof; an end cap 31 is provided on a left side surface of the horizontal tube connector A 23 on a left side, an inlet 20 is provided on an up surface of the horizontal tube connector A 23 on the left side, and an outlet 21 is provided on the horizontal tube connector A 23 on a right side; wherein the inlet 20 and the outlet 21 is communicated with an insulation barrel outside; the insulation barrel, the horizontal tube connector A 23, the tube cavity 24, the first connecting pipe hole 27 and the heat conduction chamber 6 are filled with thermal medium 26, so as to absorb heat of sunlight by light and heat absorption layer 2 to form a heat circulation engineering; if the heat absorption layer 2 of the upper plate 3 of the tile or the plate adopts a photovoltaic layer, a double system engineering of heat and power supplying is achieved.

Figure 13:
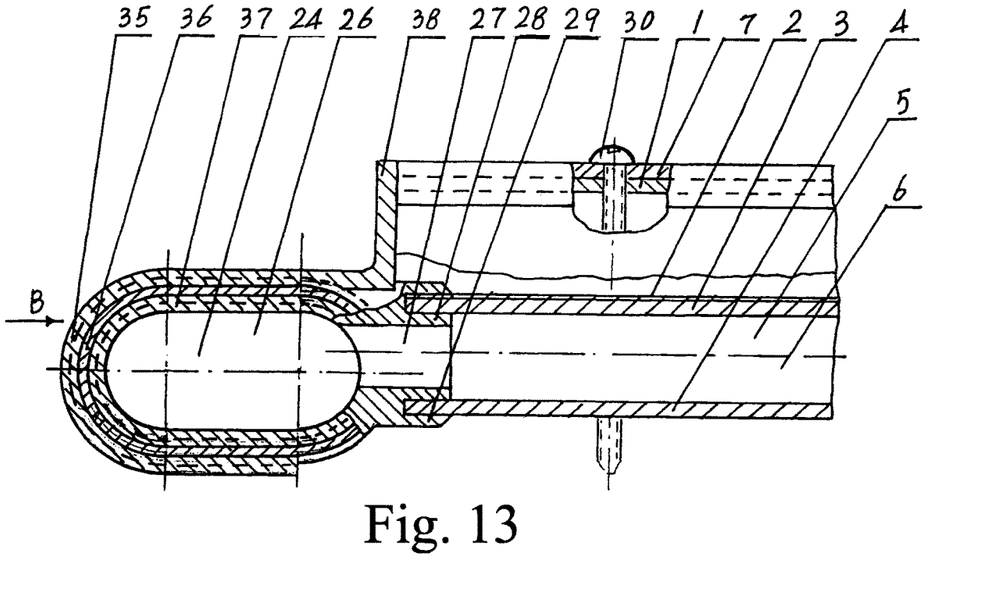
FIG. 13 is a schematic installation view showing that horizontal tube connectors of two adjacent tile plates provide on the roof are connected by a flexible tube.
Figure 14:
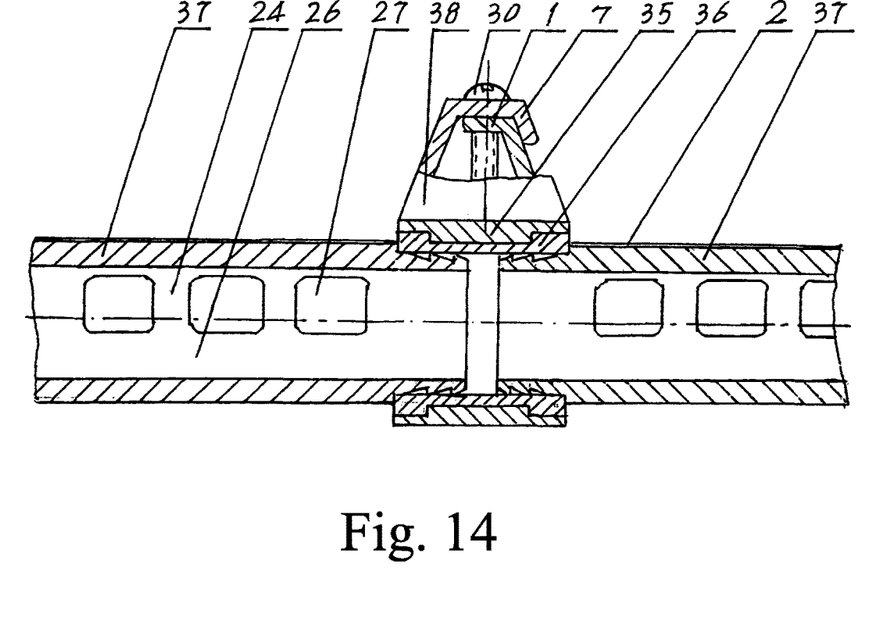
FIG. 14 is a side view of FIG. 11.

In FIGS. 13 and 14, two adjacent second group of horizontal tube connectors 37 are connected by a flexible pipe 36, a left end portion and a right end portion of the second group of horizontal tube connectors 37 are oval in shape and with inverted teeth, and the left end and the right end of the has smaller diameter than other portion of the second group of horizontal tube connectors 37; the flexible pipe 36 is in shape of a oval ring, end portions of the flexible pipe 36 is thickened in surfaces of two ends, so as to form a U shape outward, a card shell 35 is provided on a periphery on three directions of the flexible pipe 36, and a second baffle plate 38 is provided upwardly on a right end of the card shell 35. Other structures and principles are identical to FIGS. 11 and 12.

Figure 15:
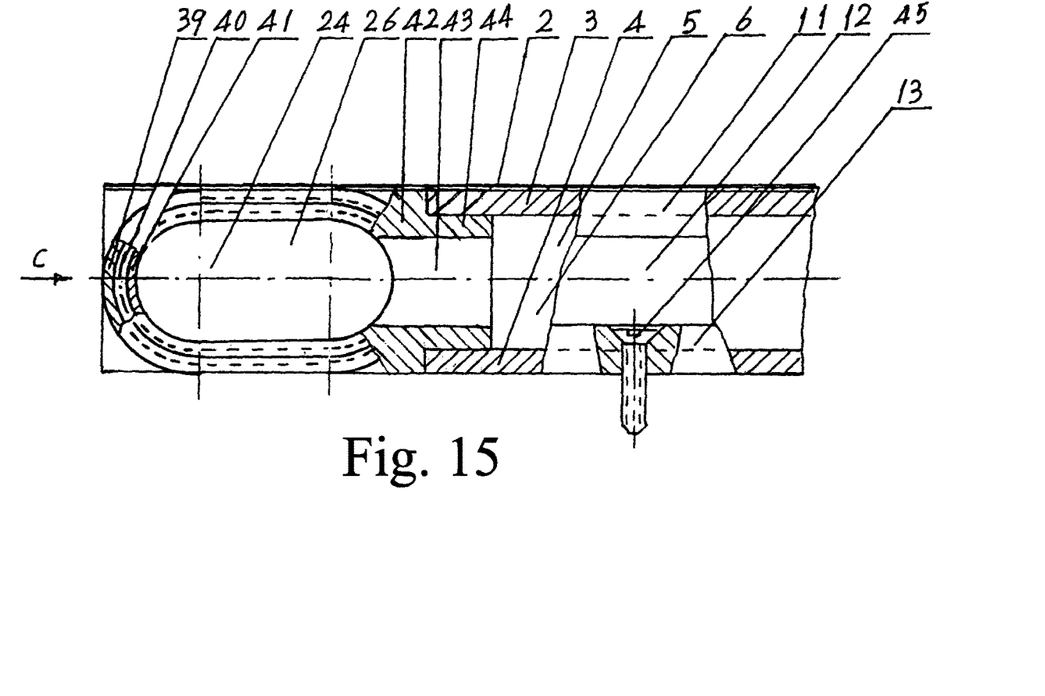
FIG. 15 is a schematic installation view showing that horizontal tube connectors of two adjacent wall plates provide on the roof are connected by plug connection.
Figure 16:
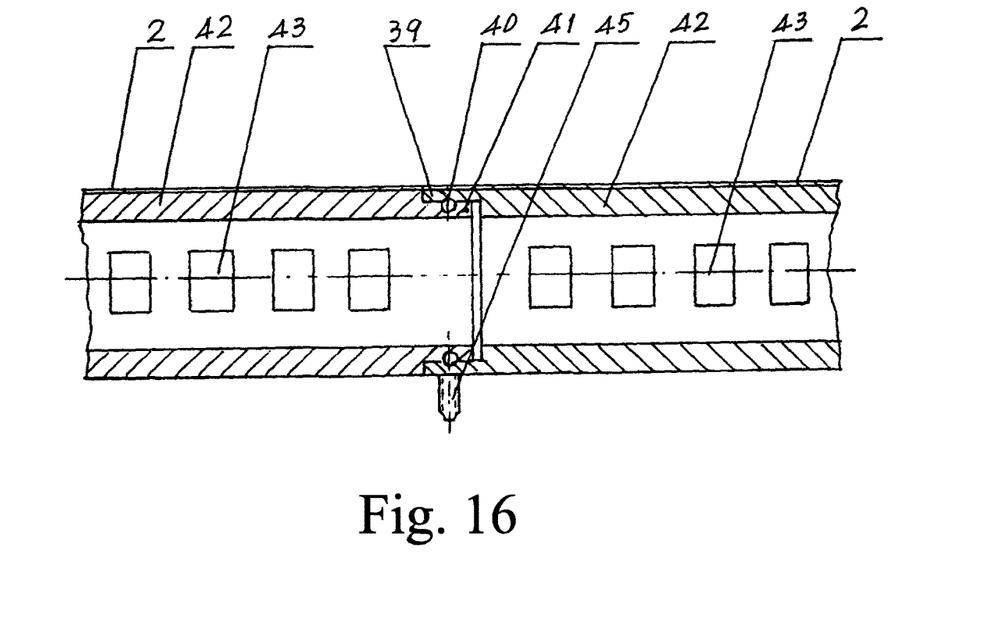
FIG. 16 is a side view of FIG. 13.
Figure 17:
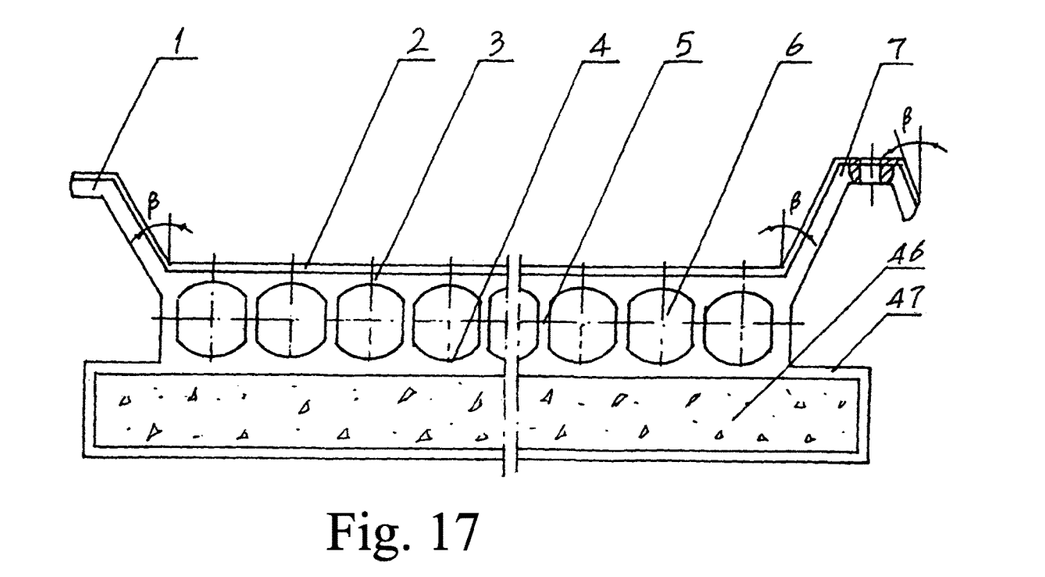
FIG. 17 is a structural schematic view of a thermal insulation tile plate with an insulation layer on a bottom of the tile plate provided on the roof.
Figure 18:
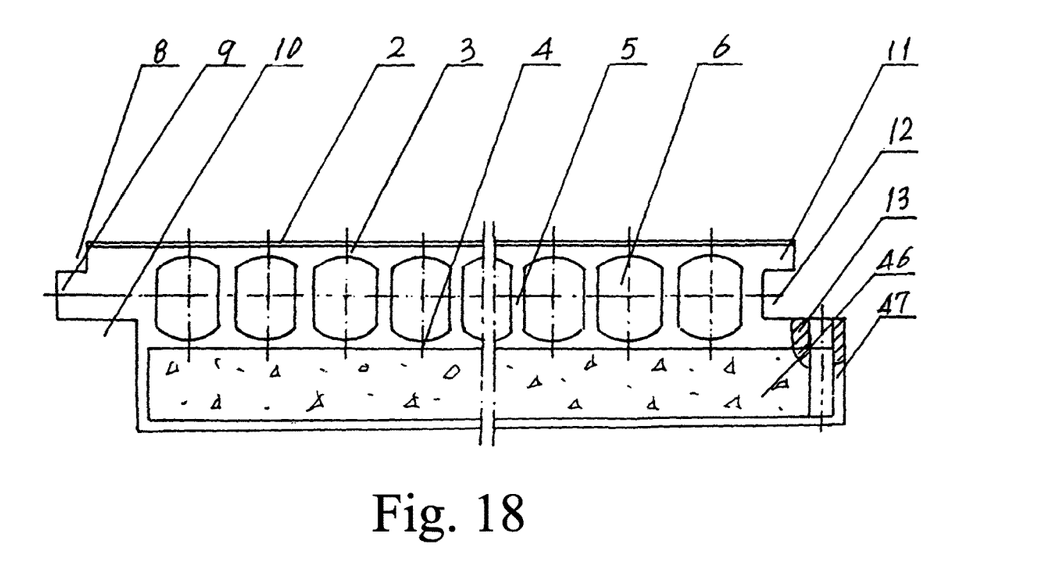
FIG. 18 is a structural schematic view of a thermal insulation wall plate with an insulation layer on a bottom of the wall plate provided on the roof.
Figure 19:
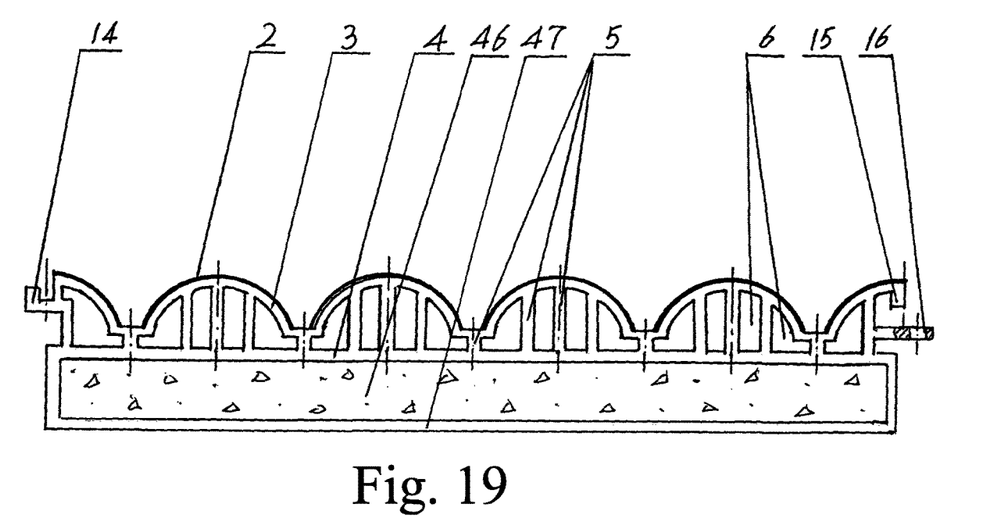
FIG. 19 and FIG. 20 are structural schematic views of a thermal insulation tile plate with an insulation layer on a bottom of the tile plate/wall plate provided on a roof/wall.
Figure 20:
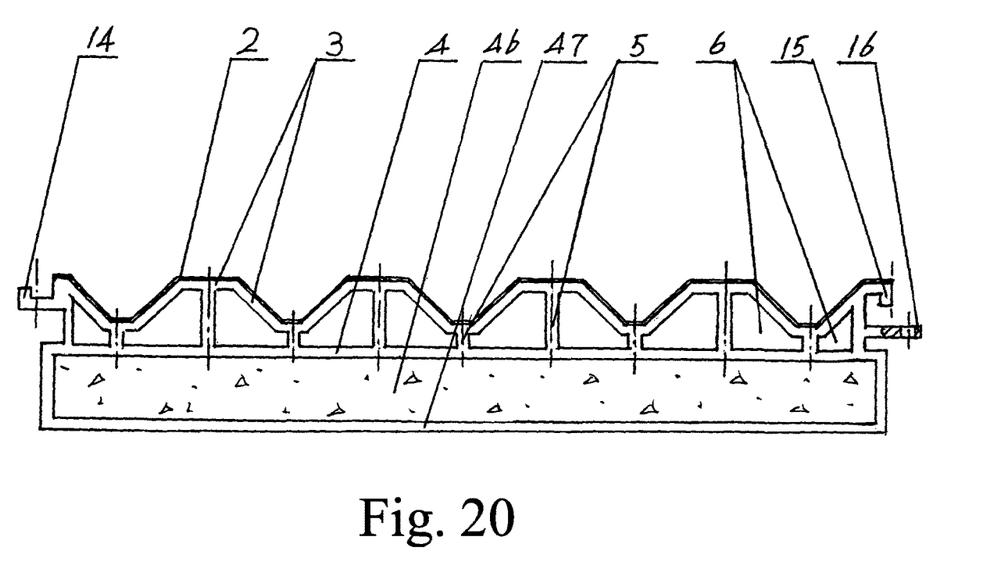

FIGS. 15 and 16 are a schematic installation views showing an integral wall plate engineering of a plug bush connections between two adjacent wall plates, between the wall plate and the third group of horizontal tube connectors 42; and between two adjacent third group of horizontal tube connectors 42; and showing cycling operation principle and structure of filing each pipe and chamber with thermal medium 26.

The multi-functional multi-purpose tile or plate, further comprising a third group of horizontal tube connectors 42, wherein an external periphery of the third group of horizontal tube connectors 42 is a rectangular tube, and an inner cavity 24, a left plug bush 39 and a right plug bush 41 are all oval tube, a right side of the third group of horizontal tube connectors 42 extends and a bottom bench of the third group of horizontal tube connectors 42 is connected with a second connecting pipe 44 a shape of a periphery of the right side of the third group of horizontal tube connectors 42 is identical to an inner hole of the heat conduction chamber 6 for connecting a wall plate; a second connecting pipe hole 43 communicated with the tube cavity 24 is provided in the third group of horizontal tube connectors 42, a space for installing the connecting ribs 5 is provided between two adjacent second connecting pipes 44, so as to form a structure capable of inserting the second connecting pipe 44 into the heat conduction chamber 6 in the wall plate, and the two adjacent second connecting pipes 44 form an integral structure by adhering or welding.

A left plug bush 39 having a thickness of a half of a thickness of a tube wall of the third group of horizontal tube connectors 42 is provided on a periphery of an internal hole on a left end of the third group of horizontal tube connectors 42, and a right plug bush 39 having a thickness of a half of a thickness of a tube wall of the third group of horizontal tube connectors 42 is provided on a periphery on a right end of the third group of horizontal tube connectors 42, a concave of the "o" shaped ring 40 is provided on a periphery of the third group of horizontal tube connectors 42 is connected by inserting the left plug bush 39 and the right plug bush 41 and are sealed with each other by the "o" shaped ring 40.

The light and heat absorption layer 2 is provided on an up surface of the third group of horizontal tube connectors 42 and the upper plate 3 of the wall plate; two adjacent wall plates are connected with each other by convexes and a concaves on a left end surface and a right end surface thereof, and a bolt 45 passes through the right low convex 13 to fix the wall plate.

A first end of the third group of horizontal tube connectors 42 on a lower portion of the wall plate is connected with a bottom of the insulation barrels by pipes, and a second end thereof is sealed; a first end of the first group of horizontal tube connectors 42 on an upper portion of the wall plate is connected with an up portion of the insulation barrels by pipes, and a second end thereof is sealed; the insulation barrel, the tube cavity 24 of the third group of horizontal tube connectors 42, and the heat conduction chamber 6 are filled with thermal medium 26, so as to absorb heat of sunlight by light and heat absorption layer 2 to form a heat circulation engineering; if the heat absorption layer 2 adopts a photovoltaic layer, a double system engineering of heat and power supplying is achieved.

Referring FIGS. 17-20, an insulating layer 46 is provided on a bottom of the tile plate and the wall plate, and the insulating layer 46 is connected with the tile plate or the wall plate via an external backplate 47 to form an integral structure, in such a manner that a thermal insulation tile plate and a thermal insulation wall plate are formed for an energy-saving emission reduction engineering.

What is claimed is:

1. Multi-functional multi-purpose tiles, comprising: a plurality of heat conduction chambers which are in a shape of a semicircle, a circle, a squircle, a rounded rectangle or a rhombus are evenly provided between an upper plate and a lower plate by a plurality of connecting ribs, so as to form perforated plate units; a left cover plate and a right cover plate, or hook shaped embedded device are respectively provided upwardly on a left end edge or a right end edge of the perforated plate units; each of the heat conduction chambers are communicated via horizontal tube connectors (23); the horizontal tube connectors of two adjacent plates are connected by a card sleeve, a flexible tube or a plug bush, so as to form an integrated circulatory system;

wherein the horizontal tube connectors are oval pipes, a first connecting pipe is externally provided on a right side of the horizontal tube connectors, the first connecting pipe is connected with the heat conduction chamber; the first connecting pipe has a first connecting pipe hole connected therein for communicating a tube cavity; external pallets are respectively provided on an upper side or a lower side of each of connecting pipes; a space for connecting each of the connecting ribs is provided between two adjacent connecting pipes, so as to form a structure that is capable of inserting the upper plate, the lower plate and the connecting ribs of the multi-functional multi-purpose tiles into the horizontal tube connectors; a first U-shaped tube which has a larger diameter than the horizontal tube connectors is sleeved on a first side of the horizontal tube connectors, a second U-shaped tube which has a larger diameter than the horizontal tube connectors is sleeved on a second side of the horizontal tube connectors, a plurality of oval concaves with sealing rings provided thereon are provided on a periphery of the horizontal tube connectors; wherein the sealing rings (19) have a structure of an oval ring.

2. The multi-functional multi-purpose tiles, as recited in claim 1, wherein the multi-functional multi-purpose tiles are in a shape of a long strip, the plurality of heat conduction chambers are separated by the plurality of the connecting ribs and evenly provided between the upper plate and the lower plate, so as to form a long strip plate with multi-holes; a left cover plate and a right cover plate are respectively provided on two side edges of each of the multi-functional multi-purpose tiles and both have an included angle of $\beta$, a top portion of the left cover plate is horizontally bended by a certain length, and a top portion of the right cover plate is horizontally bended by a certain length and then a horizontal bend of the right cover plate is bended downwardly with an included angle of $\beta$, wherein $\beta$ varies within a range of 10-80 degrees, three angles in each of the multi-functional multi-purpose tiles are equal; a light and heat absorption layer, a photovoltaic layer or a thermal transmitting layer is provided on the upper plate, the left cover plate and the right cover plate of the multi-functional multi-purpose tiles.

3. The multi-functional multi-purpose tiles, as recited in claim 1, further comprising a draw-in attachment which is U-shaped, and a U-shaped left sockolet is provided in a left side of the draw-in attachment, and a U-shaped right sockolet is provided on a right side of the draw-in attachment, the U-shaped left sockolet and the U-shaped right sockolet are inserted onto a U-shaped left tube and a U-shaped right tube on two ends of two adjacent horizontal tube connectors, in such a manner that adjacent horizontal tube connectors are tightly connected, and the adjacent horizontal tube connectors are sealed by the sealing rings with a film shield on an end surface; a baffle plate for blocking the left cover plate and the right cover plate of two adjacent tiles or plates are provided upwardly on a right end surface of the draw-in attachment; a screw nail passes through the two adjacent tiles or plates, the left cover plate and the right cover plate to fixedly fasten the two adjacent tiles or plates to a roof; an end cap is provided on a left side surface of the horizontal tube connectors on a left side, an inlet is provided on an upper surface of the horizontal tube connectors on the left side, and an outlet is provided on the horizontal tube connectors on a right side; wherein the inlet and the outlet are communicated with an insulation barrel outside; the insulation barrel, the horizontal tube connectors, the tube cavity, the connecting pipe hole and the heat conduction chamber are filled with thermal medium, so as to absorb heat of sunlight by light and heat absorption layer to form a heat circulation engineering; if the heat absorption layer of the upper plate of the tile or the plate adopts a photovoltaic layer, a double system engineering of heat and power supplying is achieved.

4. The multi-functional multi-purpose tiles, as recited in claim 1, wherein an insulating layer is provided on a bottom of the tile plate, and the insulating layer is connected with the tile plate via an external backplate to form an integral structure, in such a manner that a thermal insulation tile plate and a thermal insulation wall plate are formed for an energy-saving emission reduction engineering.

\* \* \* \* \*